(12) United States Patent
Lee

(10) Patent No.: US 11,720,648 B2
(45) Date of Patent: Aug. 8, 2023

(54) DEEP LEARNING MACHINE AND OPERATION METHOD THEREOF

(71) Applicant: HYUNDAI MOBIS CO., LTD., Seoul (KR)

(72) Inventor: Hyuk Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 8 days.

(21) Appl. No.: 17/397,220

(22) Filed: Aug. 9, 2021

(65) Prior Publication Data
US 2022/0351010 A1   Nov. 3, 2022

(30) Foreign Application Priority Data
May 3, 2021   (KR) .................. 10-2021-0057399

(51) Int. Cl.
G06K 9/62 (2022.01)
G06N 3/02 (2006.01)
G06F 18/214 (2023.01)
G06F 18/24 (2023.01)

(52) U.S. Cl.
CPC ...... *G06F 18/2155* (2023.01); *G06F 18/2148* (2023.01); *G06F 18/24* (2023.01); *G06N 3/02* (2013.01)

(58) Field of Classification Search
CPC .. G06K 9/6259; G06K 9/6257; G06K 9/6267; G06N 3/02
See application file for complete search history.

(56) References Cited

U.S. PATENT DOCUMENTS

| | | |
|---|---|---|
| 2015/0049641 A1 | 2/2015 | Pugaczewski |
| 2018/0370540 A1 | 12/2018 | Yousuf et al. |
| 2019/0041853 A1 | 2/2019 | Jain et al. |
| 2019/0180177 A1* | 6/2019 | Yim .................. G06N 3/08 |
| 2019/0303567 A1 | 10/2019 | Batmaz et al. |

FOREIGN PATENT DOCUMENTS

| | | |
|---|---|---|
| KR | 10-2120007 B1 | 6/2020 |
| KR | 10-2132407 B1 | 7/2020 |
| KR | 10-2020-0094641 A | 8/2020 |
| KR | 10-2020-0095355 A | 8/2020 |

* cited by examiner

*Primary Examiner* — David F Dunphy
(74) *Attorney, Agent, or Firm* — NSIP Law

(57) ABSTRACT

A deep learning machine includes a classification unit having a labeling criterion and configured to label input data according to the labeling criterion, a conversion unit configured to integerize input data labeled as a first type requiring integerization among the input data labeled by the classification unit, a first learning data unit configured to receive the input data of the first type integerized through the conversion unit and to infer output data, and a second learning data unit configured to receive input data labeled as a second type requiring no integerization and to infer the output data.

19 Claims, 3 Drawing Sheets

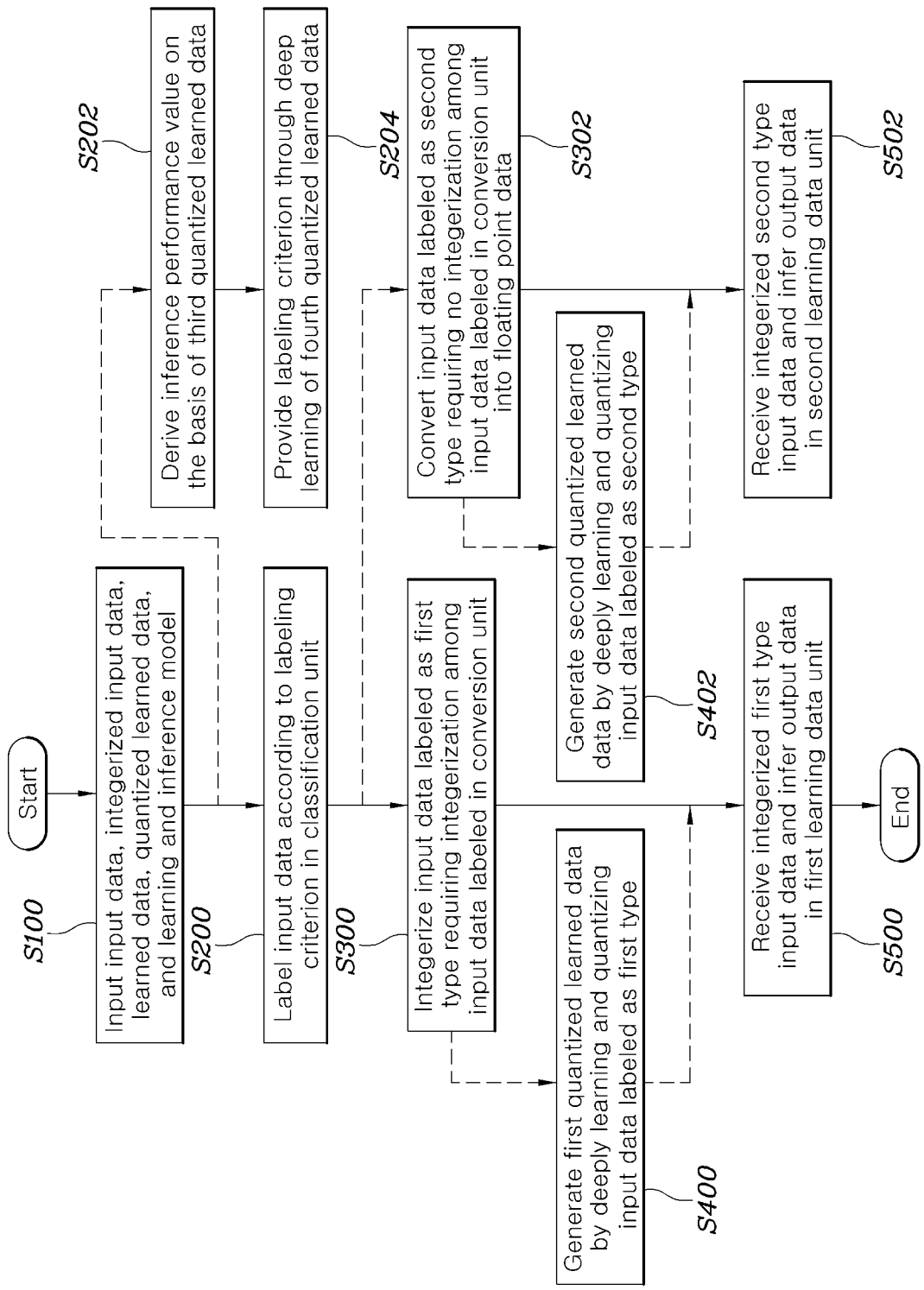

DEEP LEARNING MACHINE AND OPERATION METHOD THEREOF

CROSS-REFERENCE TO RELATED APPLICATION

This application claims the priority benefit of Korean Patent Application No. 10-2021-0057399, filed on May 3, 2021 in the Korean Intellectual Property Office, the disclosure of which is incorporated herein by reference.

BACKGROUND OF THE INVENTION

1. Field of the Invention

The present invention relates to a deep learning machine and an operation method thereof capable of reducing the number of operations necessary to process complicated input data while preventing feature loss due to integer operations and maximizing deep learning performance by additionally using classification deep learning for distinguishing input data, which does not cause deterioration in recognition performance based on floating point operations in deep learning inference based on integer operations.

2. Description of the Related Art

Machine learning technology has arisen to solve problems of hardly finding rules for distinguishing objects, such as image recognition. Machine learning is a technology of receiving and representing data and generalizing unknown data based thereon mainly using a statistical method on the basis of known features of data to be learnt. To use rules of machine learning obtained in this manner, features of input data need to be extracted. In this process, deep learning technology can be used.

However, this deep learning technology requires a large number of operations for complicated and massive input data. Accordingly, a recent trend is to integerize floating point operations and embed the integerized operations in order to drive the deep learning technology in a system having limited resources, such as a smartphone.

However, an integer based algorithm suffers recognition performance deterioration in an unprocessed data quantization process differently from a floating point based algorithm. Particularly, such recognition performance deterioration considerably occurs in a process of quantizing values of data when the data is concentrated on a specific section, that is, extreme ends. Therefore, technology for solving this problem is required.

It will be understood that the above matters described in the related art are merely for promotion of understanding of the background of the invention and should not be recognized as prior art well-known to those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Therefore, the present invention has been made in view of the above problems, and it is an object of the present invention to provide a deep learning machine and an operation method thereof capable of reducing the number of operations necessary to process complicated input data while preventing feature value loss due to integer operations and maximizing deep learning performance by additionally using classification deep learning for distinguishing input data, which does not cause deterioration in recognition performance based on floating point operations in deep learning inference based on integer operations.

In one general aspect, a deep learning machine includes a classification unit having a labeling criterion and configured to label input data according to the labeling criterion, a conversion unit configured to integerize input data labeled as a first type requiring integerization among the input data labeled by the classification unit, a first learning data unit configured to receive the input data of the first type integerized through the conversion unit and to infer output data, and a second learning data unit configured to receive input data labeled as a second type requiring no integerization and to infer the output data.

The labeling criterion may be provided based on an inference performance value derived by receiving the integerized input data and inferring the output data.

The inference performance value may be derived by inferring the output data based on third quantized learned data obtained by deeply learning and quantizing the input data.

The labeling criterion may be provided based on fourth quantized learned data obtained by deeply learning and quantizing rules with respect to a difference between an inference performance value of the input data and an inference performance value of the integerized input data.

The classification unit may have at least one labeling criterion corresponding to a class of the input data.

The first learning data unit may infer the output data based on first learned data derived through deep learning of the input data labeled as the first type.

The first learning data unit may infer the output data based on first quantized learned data obtained by quantizing the first learned data.

The second learning data unit may infer the output data based on second quantized learned data obtained by deeply learning and quantizing the input data labeled as the second type.

In another general aspect, a deep learning machine operation method includes receiving, by a classification unit having a labeling criterion, input data and labeling, by the classification unit, the input data according to the labeling criterion; intergerizing, by a conversion unit, input data labeled as a first type requiring integerization among the input data labeled by the classification unit; and receiving, by a first learning data unit, the integerized input data of the first type and inferring, by the first learning data unit, output data.

The labeling criterion may be provided based on an inference performance value derived by receiving the integerized input data and inferring the output data based on third quantized learned data obtained by deeply learning and quantizing the input data.

The labeling criterion may be provided through deep learning of fourth quantized learned data obtained by deeply learning and quantizing rules with respect to a difference between an inference performance value of the input data and an inference performance value of the integerized input data.

In performing labeling in the classification unit, labeling may be performed according to at least one labeling criterion corresponding to a class of the input data.

In the inferring the output data in the first learning data unit, the output data may be inferred based on first quantized learned data obtained by deeply learning and quantizing the input data labeled as the first type.

The deep learning machine operation method may include receiving, by a second learning data unit, input data labeled as a second type requiring no integerization and inferring, by the second learning data unit, the output data after inferring the output data in the first learning data unit.

In inferring the output data in the second learning data unit, the output data may be inferred based on second quantized learned data obtained by deeply learning and quantizing the input data labeled as the second type.

Other features and aspects will be apparent from the following detailed description, the drawings, and the claims.

BRIEF DESCRIPTION OF THE DRAWINGS

FIG. 3 is a flowchart of a deep learning machine operation method according to an embodiment of the present invention.

DETAILED DESCRIPTION OF THE PREFERRED EMBODIMENTS

Figure 1:
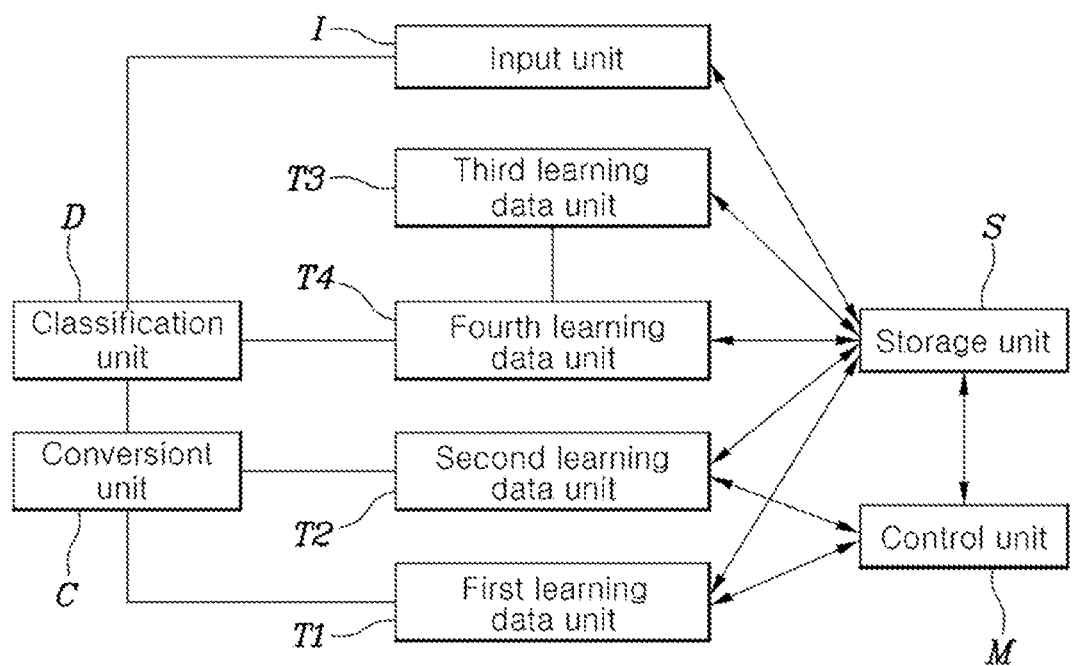
FIG. 1 is a configuration diagram of a deep learning machine according to an embodiment of the present invention.

Specific structural and functional descriptions of embodiments of the present invention disclosed in the present specification or application are illustrated for the purpose of describing embodiments according to the present invention, and embodiments according to the present invention may be implemented in various forms and should not be construed to be limited to the embodiments described in the present specification and application. Hereinafter, an embodiment of the present invention will be described in detail with reference to the attached drawings.

A "~unit" used in the present embodiment may be implemented as a task, a class, a subroutine, a process, an object, an execution thread, a program, software such as a program-based AI accelerator or a software combination executed in a predetermined area in a memory, hardware such as an application specific integrated circuit (ASIC), a digital signal processor (DSP), a vision processing unit (VPC), a neuromorphic IC, or a hardware-based AI accelerator, or a hardware combination. In addition, a "~unit" in the present embodiment may be implemented as a combination of software or software combination and hardware. Further, a "~unit" may be included in a computer-readable storage medium. Moreover, a "~unit" in the present embodiment may be distributed to a plurality of pieces of hardware or software, or a combination thereof. In this case, data processing of the "~unit" in the present embodiment may be distributed, concentrated, or accelerated with cloud computing, edge computing or AI edge computing.

In addition, "deep learning" used in the present embodiment is a kind of machine learning and may be used interchangeably with machine learning. Machine learning is a technology concerning a system of performing learning and inference based on empirical data to improve the performance thereof and an algorithm therefor. That is, machine learning is a method of constructing a specific model for inferring output data based on input data. Here, deep learning includes hidden data used to extract features from input data through learning parameters such as weights, bias and an activation function in an algorithm such as an artificial neural network and to transfer the extracted features to output data between the input data and the output data as a method of constructing such a specific model.

Accordingly, learning in the present description may mean a process of determining learning parameters using learning data for the purpose of the corresponding system such as classification, regression analysis, and clustering of input data. In addition, learning in the present description may be a concept including learning itself such as training or re-training or inference such as prediction or determination. Of course, deep learning in the present description includes learning (CNN and the like) using an artificial neural network using regression and machine learning using probability-based, geometry-based, and ensemble-based algorithms. Further, deep learning in the present description includes supervised learning, unsupervised learning, semi-supervised learning, and reinforcement learning.

Figure 2:
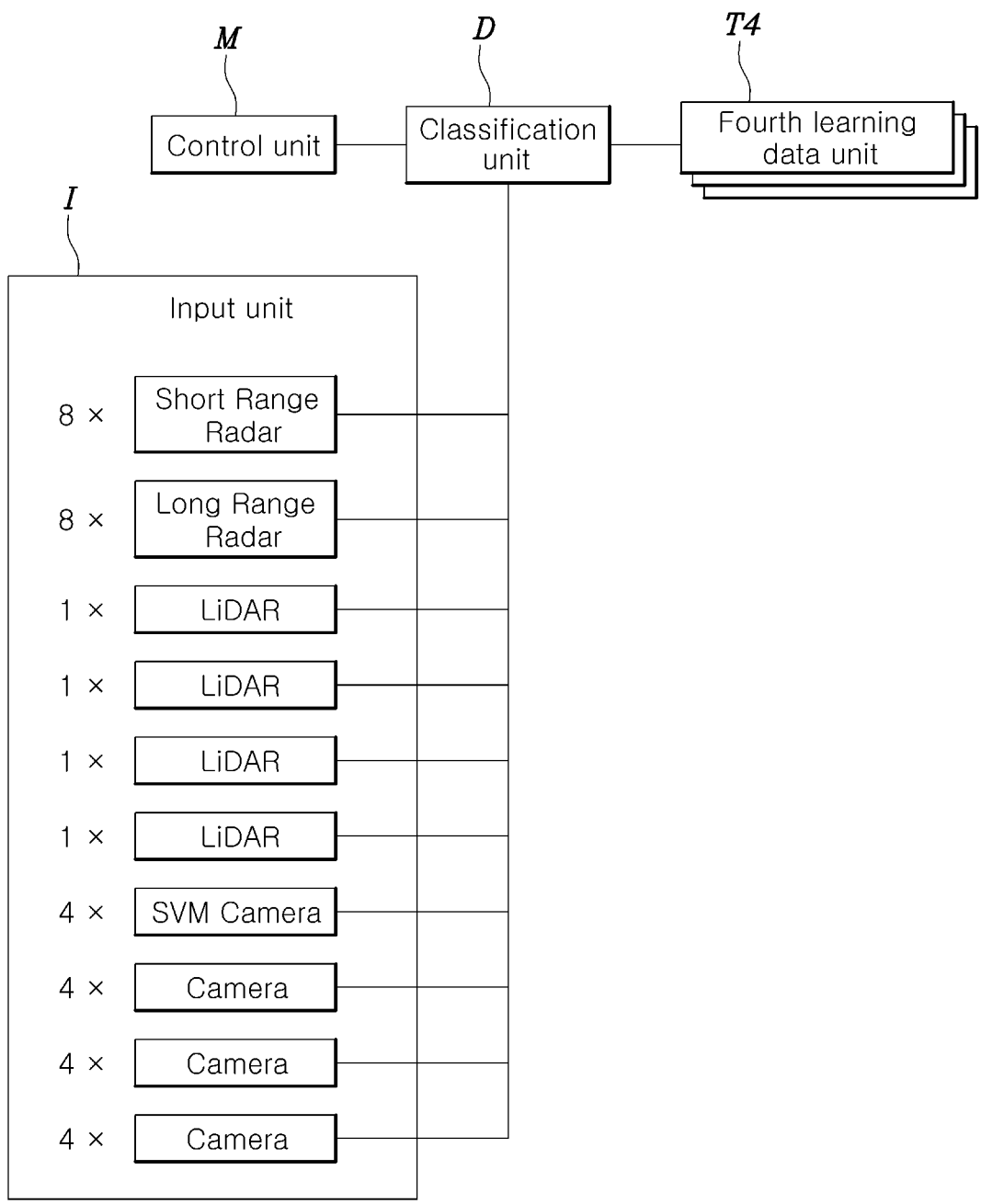
FIG. 2 is a block diagram of the deep learning machine according to an embodiment of the present invention.

FIG. 1 is a configuration diagram of a deep learning machine according to an embodiment of the present invention, FIG. 2 is a block diagram of the deep learning machine according to an embodiment of the present invention, and FIG. 3 is a flowchart of a deep learning machine operation method according to an embodiment of the present invention.

Referring to FIG. 1, which is a configuration diagram of a deep learning machine according to an embodiment of the present invention, the deep learning machine according to an embodiment of the present invention includes a classification unit D which has a labeling criterion and labels input data according to the labeling criterion, a conversion unit C which integerizes input data labeled as a first type that requires integerization among the input data labeled by the classification unit, a first learning data unit T1 which receives the first type input data integerized through the conversion unit and infers output data, and a second learning data unit T2 which receives input data labeled as a second type that does not require integerization and infers output data.

An input unit I in FIG. 1 may receive a deep learning model, training data for training or learning of the deep learning model, re-training data, input data for obtaining output using a learned model, and an output history after output or a use history of a user. The input unit I may obtain unprocessed input data and pre-processed input data for learning of the deep learning model. Here, pre-processing may mean extraction of input features from input data. Further, input data of the input unit I may be data transmitted/received to/from other devices or a user through wired/wireless communication or an interface. Data types may include image information, audio information, a signal corresponding to information, data, and user input information.

Input data of the input unit I in FIG. 1 is labeled as the first type that requires integerization or the second type that does not require integerization in the classification unit D. Here, the classification unit D may have a labeling criterion. Among the input data, input data labeled as the first type that requires integerization is integerized in the conversion unit C. The first learning data unit T1 infers output data from the integerized first type input data through the deep learning model. In addition, the second learning data unit T2 infers output data from input data labeled as the second type that does not require integerization through the deep learning model without the conversion unit C or through a conversion unit C (not illustrated) which converts input data into floating point data.

Here, integerization is a kind of quantization that is a model compression technique of reducing a model size without losing expression of information to decrease the number of operations and improve an operation speed and efficiency. Further, integerization in the present description means conversion of input data including floating points into integer data including fixed points or integers. Particularly, integerization may mean conversion of input data into data suitable for an integer operator, that is, an operator that cannot process floating point data.

Here, input data requiring integerization may mean that information expression (e.g., resolution of image information) of the input data is not reduced by a predetermined reference value or more or a learning performance value or an inference performance value thereof is not reduced by a predetermined reference value or more. Furthermore, the first type that requires integerization and the second type that does not require integerization are incompatible. However, the first type may include a plurality of types such as a first type that more requires integerization and a first type that less requires integerization. Likewise, the second type may include a plurality of types such as a second type that does not more require integerization and a second type that does not less require integerization.

A control unit M in FIG. 1 controls a device on the basis of the output data inferred by the first learning data unit T1 or the second learning data unit T2. Further, the control unit M in FIG. 1 may control the amount of learning, a learning speed, the amount of inference, and an inference speed of the first learning data unit T1 or the second learning data unit T2. For example, the control unit M may control a power generation device, a power transmission device, a braking device, or a steering device for autonomous driving, an electric device for user convenience of autonomous driving, or a peripheral device thereof on the basis of output data obtained by extracting features of an image measured in a vehicle. Here, the control unit M may control a device such that information about speeds or distances of obstacles in an image is preferentially learned or output in order to execute a high-priority function with respect to risk of vehicle collision.

The control unit M in FIG. 1 may determine an optimal control point at which a specific function is executed by combining data stored in a storage unit S and output data in a control step. The storage unit S in FIG. 1 may store programs and/or data used in components constituting the deep learning machine. Further, the storage unit S in FIG. 1 may store learning parameters for learning, quantization parameters for quantization, input data, and output data.

Deep learning requires a large number of operations for complicated and massive input data. Owing to this, introduction of deep learning into a system having limited resources, such as a smartphone, considerably decreases an operation speed. Particularly, this becomes serious when input data is unprocessed or floating point data. Accordingly, to drive deep learning in such a system, it is necessary to integerize and embed floating point operations. However, a deep learning algorithm based on integer input data suffers recognition performance deterioration in a process of integerizing unprocessed data, differently from an algorithm based on floating point input data. Particularly, such recognition performance deterioration seriously occurs in a process of integerizing values of data and quantizing learned data obtained by learning the values when the data is concentrated in a specific section, that is, extreme ends.

Accordingly, to solve this problem, the deep learning machine according to an embodiment of the present invention adds a classification network and combines the same with the deep learning model. That is, in the present embodiment, input data is classified into input data of the first type and the second type, that is, input data that requires integerization and input data that does not integerization, the input data that requires integerization is integerized and inferred according to features thereof, and the input data that does not integerization is inferred according to features thereof. Accordingly, the deep learning machine according to an embodiment of the present invention can secure a high operation speed of inference through integer based input data while maintaining and improving performance and accuracy of inference through floating point based input data.

Referring to FIG. 1, which is a configuration diagram of the deep learning machine according to an embodiment of the present invention, a labeling criterion may be provided on the basis of an inference performance value that is derived by receiving integerized input data and inferring output data. Further, the inference performance value may be derived by inferring output data based on third quantized learned data obtained by deeply learning and quantizing input data. That is, in the embodiment of the present invention, an inference performance value may be determined through pre-processed learned data and a labeling criterion may be provided on the basis of the inference performance value in a step prior to an integerization based inference step.

A third learning data unit T3 in FIG. 1 receives unintegerized input data (not illustrated) from the storage unit S or the input unit I and performs deep learning thereon to generate third learned data. Further, the third learning data unit T3 quantizes the third learned data to generate third quantized learned data, receives unintegerized input data and integerized input data through the third quantized learned data, and infers output data. Accordingly, a labeling criterion may be provided in the classification unit D on the basis of inference performance of the third learning data unit T3 and inference performance according to inference (not illustrated) of the integerized input data.

Although such an inference performance value may be supervised, this is not desirable for the purpose of machine learning. Particularly, such an inference performance value may be calculated through mean intersection over union (mIOU) used in image detection and unit segmentation. In this case, it is desirable to perform inference based on the third learned data or the third quantized learned data obtained by performing deep learning of the unintegerized input data. This may cause increase in complexity, and thus it is desirable to generate a simple classification network. When input data that requires integerization or does not require integerization is labeled on the basis of an inference performance value proactively measured through the simple classification network, inference performance is improved. Consequently, the deep learning machine according to an embodiment of the present invention has a labeling criterion according to an inference performance value based on the third quantized learned data and thus can clarify a criterion for input data that requires integerization and improve the inference performance thereof according to the criterion.

Referring to FIG. 1, which is a configuration diagram of the deep learning machine according to an embodiment of the present invention, a labeling criterion may be provided on the basis of fourth quantized learned data obtained by deeply learning and quantizing rules with respect to a difference between an inference performance value of input data and an inference performance value of integerized input data. That is, the labeling criterion is derived through deep learning based on the fourth quantized learned data in the present embodiment.

A fourth learning data unit T4 in FIG. 1 receives an inference performance value obtained by receiving integerized input data (not illustrated) from the storage unit S or the input unit I and inferring output data. This inference may be performed in the aforementioned third learning data unit T3. The fourth learning data unit T4 receives inference performance values of input data and integerized input data from the third learning data unit T3 and performs deep learning of rules with respect to deterioration of an inference performance value due to integerization of input data. The fourth learning data unit T4 obtains a labeling criterion on the basis of the fourth quantized learned data obtained by quantizing the rules to update the labeling criterion. Consequently, the deep learning machine according to an embodiment of the present invention performs deep learning of a criterion for input data that requires integerization and updates the criterion by obtaining a labeling criterion according to an inference performance value based on learned data including the third quantized learned data. Accordingly, the classification performance of the machine is improved and the inference performance of integer-based inference corresponding thereto is also improved.

FIG. 2 is a block diagram of the deep learning machine according to an embodiment of the present invention. The classification unit D may have at least one labeling criterion corresponding to a class of input data. Input data input to the input unit I in FIG. 2 may include image data. In this case, the image data may be the sum of still image data and audio data segmented in time. However, devices (an SR radar, an LR radar, LiDAR, an SVM camera, and a camera) that receive such images in real time, as shown in FIG. 2, receive different types of image data according to the purposes and functions thereof. Accordingly, the classification unit D in FIG. 2 may have different labeling criteria suitable for input data included in image data input to the devices in the input unit I. These labeling criteria may be provided by differently setting the aforementioned fourth learning data unit T4 for the respective devices. Accordingly, the control unit M may control a related device according to inference of the first and second learning data units T1 and T2 depending on a labeling criterion suitable for each fourth learning data unit T4.

Accordingly, the deep learning machine according to an embodiment of the present invention can optimize an information quantity and type of input data, an information quantity and type of output data suitable for the information quantity and type of input data, and advancement thereof by providing a labeling criterion corresponding to a class of input data. Particularly, output data of each of the aforementioned devices may be advanced for classification and localization, image detection, semantic segmentation, and object segmentation which are important in image information. For example, each device may require a low-level stage for collision warning and emergency braking and a high-level stage for maintaining a distance between vehicles. The present embodiment may be optimized for a more important one between the two stages. Accordingly, the deep learning machine according to an embodiment of the present invention may perform control of reducing the amount of learning for input data that need not be advanced or increasing the amount of learning for input data that needs to be advanced if labeling of input data is optimized for advancement. Therefore, integer operations are optimized to be suitable for image information and necessary output information such that accurate control and rapid operation can be performed in the present embodiment.

Referring to FIG. 1, which is a configuration diagram of the deep learning machine according to an embodiment of the present invention, the first learning data unit T1 may infer output data on the basis of first learned data derived through deep learning of input data of the first type. Further, the first learning data unit may infer output data on the basis of first quantized learned data obtained by quantizing the first learned data. In addition, the second learning data unit may infer output data on the basis of second quantized learned data obtained through deep learning and quantization of input data of the second type. That is, learning and inference suitable for each type are performed in an embodiment of the present invention.

Learned data obtained through deep learning may be provided through floating point based input data or integer based input data. However, high inference performance and operation speed are obtained when integer operation based inference is performed on the basis of the first learned data and the second learned data obtained through deep learning of the first type that requires integerization and the second type that does not require integerization as input data suitable for integer operations. In this process, it is advantageous to quantize the first learned data. Accordingly, the deep learning machine according to an embodiment of the present invention can improve the performance of integer operation based inference by performing inference through the first/second learned data obtained by re-learning (quantizing) features of input data classified based on a labeling criterion.

FIG. 3 is a flowchart of a deep learning machine operation method according to an embodiment of the present invention. The deep learning machine operation method according to the present invention includes a step S200 in which the classification unit having a labeling criterion receives input data and labels the input data according to the labeling criterion, a step S300 in which the conversion unit integerizes input data labeled as the first type that requires integerization among the labeled input data, and a step S500 in which the first learning data unit receives the integerized first type input data and infers output data.

In the first step of the deep learning machine operation method according to an embodiment of the present invention, input data, integerized input data, learned data, quantized learned data, and a learning and inference model are input as shown in FIG. 3 (S100). This input may be performed in the input unit I or the storage unit S. In the next step, the classification unit labels the input data as the first type that requires integerization and the second type that does not require integerization according to the labeling criterion (S200). This labeling criterion may be provided by deriving third quantized learned data or an inference performance value based on the third quantized learned data (S202). Alternatively, the labeling criterion may be provided through deep learning of fourth learned data (not illustrated) or fourth quantized learned data derived through deep learning of rules with respect to differences between inference performance values (S204).

In the next step, the conversion unit integerizes input data labeled as the first type that requires integerization among the labeled input data (S300). Simultaneously, the conversion unit may convert input data labeled as the second type that does not require integerization into floating point data (S302). In the final step, the first learning data unit infers output data based on the integerized first type input data (S500). Additionally, the second learning data unit may infer output data on the basis of integerized second type input data (S502).

Prior to the final step, the first learning data unit may generate first quantized learned data by deeply learning and quantizing the input data labeled as the first type (S400). Accordingly, inference in the final step may be performed on the basis of the first quantized learned data. Similarly, the second learning data unit may generate second quantized learned data by deeply learning and quantizing the input data labeled as the second type prior to the final step (S402). Accordingly, inference in the final step may be performed on the basis of the second quantized learned data.

Consequently, the deep learning machine operation method according to an embodiment of the present invention adds a classification network and combines the same with the deep learning model. Accordingly, the deep learning machine operation method according to an embodiment of the present invention can secure a high operation speed of inference through integer based input data while maintaining and improving performance and accuracy of inference through floating point based input data.

In the flowchart of the deep learning machine operation method according to an embodiment of the present invention in FIG. 3, labeling may be performed according to a labeling criterion provided on the basis of an inference performance value derived by inferring output data from integerized input data on the basis of the third quantized learned data obtained by deeply learning and quantizing the input data (S202) in the labeling step (S200) performed in the classification unit. When input data that requires integerization or input data that does not integerization is labeled on the basis of the inference performance value proactively measured through such a simple classification network, inference performance is improved. Consequently, the deep learning machine operation method according to an embodiment of the present invention provides a labeling criterion according to an inference performance value based on the third quantized learned data and thus can clarify a criterion for input data that requires integerization and improve the inference performance of the machine according to the criterion.

In the flowchart of the deep learning machine operation method according to an embodiment of the present invention in FIG. 3, labeling may be performed according to a labeling criterion provided through deep learning of the fourth quantized learned data obtained by deeply learning and quantizing rules with respect to a difference between an inference performance value of input data and an inference performance value of integerized input data (S204) in the labeling step (S200) performed in the classification unit. In this step, the labeling criterion is updated by providing a labeling criterion based on the fourth quantized learned data. Consequently, the deep learning machine operation method according to an embodiment of the present invention deeply learns and updates a criterion of input data that requires integerization by providing a labeling criterion according to an inference performance value based on learned data including the third quantized learned data. Accordingly, the classification performance of the machine is improved and the inference performance of integer-based inference corresponding thereto is also improved.

In the flowchart of the deep learning machine operation method according to an embodiment of the present invention in FIG. 3, labeling may be performed according to at least one labeling criterion corresponding to a class of input data in the labeling step (S200) performed in the classification unit. Accordingly, the deep learning machine operation method according to an embodiment of the present invention can optimize an information quantity and type of input data, an information quantity and type of output data suitable for the information quantity and type of input data, and advancement thereof by providing a labeling criterion corresponding to a class of input data. Therefore, the deep learning machine operation method according to an embodiment of the present invention optimizes integer operations to be suitable for image information and necessary output information such that accurate control and rapid operation can be performed.

In the flowchart of the deep learning machine operation method according to an embodiment of the present invention in FIG. 3, the output data may be inferred on the basis of the first quantized learned data obtained by deeply learning and quantizing the input data labeled as the first type (S400) in the step (S500) in which the first learning data unit infers the output data. Further, the second learning data unit may receive the input data labeled as the second type that does not require integerization and infer output data (S502) after the step (S500) in which the first learning data unit infers the output data. In addition, the output data may be inferred on the basis of the second quantized learned data obtained by deeply learning and quantizing the input data labeled as the second type (S402) in the step (S502) in which the second learning data unit infers the output data.

The deep learning machine operation method according to an embodiment of the present invention is based on integer operations in the inference step. High inference performance and operation speed are obtained when integer operation based inference is performed on the basis of the first learned data and the second learned data obtained through deep learning of the first type that requires integerization and the second type that does not require integerization as input data suitable for integer operations. In this process, it is advantageous to quantize the first learned data. Consequently, the deep learning machine operation method according to an embodiment of the present invention can improve the performance of integer operation based inference by performing inference through the first/second learned data obtained by re-learning (quantizing) features of input data classified based on a labeling criterion.

The present invention relates to a deep learning machine and an operation method thereof, and more specifically, to a deep learning machine and an operation method thereof additionally using classification deep learning for distinguishing input data, which does not cause deterioration in recognition performance based on floating point operations in deep learning inference based on integer operations.

The deep learning technique of the present invention requires a large number of operations for complicated and massive input data. Owing to this, introduction of deep learning into a system having limited resources, such as a smartphone, considerably decreases operation speed. Accordingly, to drive deep learning in such a system, it is necessary to integerize floating point operations. However, a deep learning algorithm based on integer input data suffers recognition performance deterioration in a process of integerizing unprocessed data, differently from an algorithm based on floating point input data. Particularly, such recognition performance deterioration seriously occurs in a process of integerizing values of data and quantizing learned data obtained by learning the values when the data is concentrated in a specific section, that is, extreme ends.

Accordingly, to solve this problem, the deep learning machine and the operation method thereof according to an embodiment of the present invention adds a classification network and combines the same with the deep learning model. That is, the deep learning machine and the operation method thereof according to the present embodiment classify input data into input data of the first type and the second type, that is, input data that requires integerization and input data that does not integerization, integerize the input data that requires integerization, infer the same according to features thereof, and infer the input data that does not require integerization according to features thereof prior to inference through a deep learning model. Accordingly, the deep learning machine and the operation method thereof according to an embodiment of the present invention can secure a high operation speed of inference through integer based input data while maintaining and improving performance and accuracy of inference through floating point based input data.

According to the deep learning machine and the operation method thereof of the present invention, it is possible to reduce the number of operations necessary to process complicated input data while preventing feature loss due to integer operations and to maximize deep learning performance by additionally using classification deep learning for distinguishing input data, which does not cause deterioration in recognition performance based on floating point operations in deep learning inference based on integer operations.

Although specific embodiments of the present invention have been illustrated and described above, those skilled in the art will appreciate that various modifications and variations are possible without departing from the scope and spirit of the invention as disclosed in the accompanying claims.

What is claimed is:

1. An apparatus, comprising:
one or more processors configured to:
classify input data, based on a labeling criterion, between first type requiring integerization and a second type not requiring integerization;
integerize the input data classified as a the first type requiring integerization;
generate first output data using a machine learning first model with respect to the integerized input data; and
generate second output data using a machine learning second model with respect to the input data classified as the second type not requiring integerization.

2. The apparatus of claim 1, wherein the labeling criterion is based on an inference performance value derived from the integerized input data and output data generated by using machine learning third model.

3. The apparatus of claim 2, wherein the inference performance value is derived by inferring output data based on third quantized learned data, obtained by use of the machine learning third model to generate learned data, and a quantizing of the input data.

4. The apparatus of claim 1, wherein the labeling criterion is based on fourth quantized learned data, obtained by use of a machine learning third model to generate learned data, and a quantizing of rules with respect to a difference between an inference performance value of the input data and an inference performance value of the integerized input data.

5. The apparatus of claim 1, wherein, for the classifying of the input data, a machine learning classification model, having at least one labeling criterion corresponding to a class of the input data, is used to perform the classifying.

6. The apparatus of claim 1, wherein the generation of the first output data further includes using the first model provided the integerized input data to generate first learned data.

7. The apparatus of claim 6, wherein the first output data is first quantized learned data obtained by quantizing the first learned data.

8. The apparatus of claim 1,
wherein the one or more processors are further configured to quantize the input data classified as the second type, and
wherein the generation of the second output data further includes using the second model provided the quantized input data to generate first learned data, as the second output data.

9. The apparatus according to claim 1, further comprising a controller, including at least one of the one or more processors or another processor, configured control a device based on the first output data and/or the second output data.

10. The apparatus according to claim 1, wherein the input data is image data from one or more of an SR radar, an LR radar, LiDAR, an SVM camera, and a camera.

11. The apparatus according to claim 10, wherein the input data is further based on a sum of still image data and audio data segmented in time.

12. A processor-implemented method, the method comprising:
classifying input data based on a labeling criterion, between a first type requiring integerization and a second type different from the first type;
integerizing the input data classified as the first type requiring integerization; and
generating first output data using a machine learning first model with respect to the integerized input data.

13. The method of claim 12, further comprising deriving the inference performance value by inferring the output to generate learned data, and a quantizing of the input data.

14. The method of claim 12, wherein the labeling criterion is provided through deep learning of fourth quantized learned data obtained by deeply learning and quantizing rules with respect to a difference between an inference performance value of the input data and an inference performance value of the integerized input data.

15. The method of claim 12, wherein a labeling is performed according to at least one labeling criterion corresponding to a class of the input data.

16. The method of claim 12, wherein, in the generating of the output data, the output data is inferred based on a first inference from first quantized learned data obtained by deeply learning and quantizing the input data labeled as the first type.

17. The method of claim 12, further comprising:
receiving input data labeled as the second type, the second type being a type of the input data requiring no integerization; and
performing a second inference on the output data after inferring the output data in the first inference.

18. The method of claim 17, wherein, in second inference, the output data is inferred based on second quantized learned data obtained by deeply learning and quantizing the input data labeled as the second type.

19. A deep state learning machine, comprising a processor configured to:
label input data as one of to a first type, the first type being the input data requiring integerization, and a second type, the second type being the input data not requiring integerization, according to a labeling criterion, wherein the labelling criterion is based on an inference performance value derived by receiving the first output data and the second output data;

inferring the first output data according to the first type; and inferring the second output data according to the second type, wherein the labelling criterion is based on an inference performance value derived by receiving the first output data and the second output data.

\* \* \* \* \*